(12) United States Patent
Yokoyama et al.

(10) Patent No.: US 12,309,504 B2
(45) Date of Patent: May 20, 2025

(54) IMAGING DEVICE AND IMAGING METHOD

(71) Applicant: SONY SEMICONDUCTOR SOLUTIONS CORPORATION, Kanagawa (JP)

(72) Inventors: Kyoji Yokoyama, Kanagawa (JP); Ryoji Eki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 55 days.

(21) Appl. No.: 17/632,768

(22) PCT Filed: Aug. 3, 2020

(86) PCT No.: PCT/JP2020/029675
§ 371 (c)(1),
(2) Date: Feb. 3, 2022

(87) PCT Pub. No.: WO2021/029252
PCT Pub. Date: Feb. 18, 2021

(65) Prior Publication Data
US 2022/0279134 A1    Sep. 1, 2022

(30) Foreign Application Priority Data
Aug. 13, 2019   (JP) .................................. 2019-148507

(51) Int. Cl.
*H04N 23/90* (2023.01)
(52) U.S. Cl.
CPC .................................. *H04N 23/90* (2023.01)

(58) Field of Classification Search
CPC ...... H04N 23/745; H04N 23/71; H04N 23/72; H04N 25/61; H04N 25/745; H04N 25/75;
(Continued)

(56) References Cited

U.S. PATENT DOCUMENTS

| | | | |
|---|---|---|---|
| 2005/0157203 A1* | 7/2005 | Nakakuki | ............... H04N 23/71 348/370 |
| 2013/0242135 A1* | 9/2013 | Muraki | ................ H04N 23/662 348/231.5 |
| 2021/0058598 A1* | 2/2021 | Sadasue | .................... G06T 7/32 |

FOREIGN PATENT DOCUMENTS

| | | |
|---|---|---|
| CN | 102215345 A | 10/2011 |
| CN | 103327229 A | 9/2013 |

(Continued)

OTHER PUBLICATIONS

International Search Report and Written Opinion of PCT Application No. PCT/JP2020/029675, issued on Oct. 20, 2020, 09 pages of ISRWO.

*Primary Examiner* — Masum Billah
(74) *Attorney, Agent, or Firm* — CHIP LAW GROUP

(57) ABSTRACT

An imaging device (1) according to the present disclosure includes an imaging unit (2), a data acquisition unit (3), a clock generation unit (4), and a control unit (5). The imaging unit (2) captures an image, and generates image data. The data acquisition unit (3) acquires clock data related to an operation clock shared with other imaging devices. The clock generation unit (4) generates the operation clock based on the clock data received by the data acquisition unit (3). The control unit (5) controls the operation of the imaging unit (2) based on the operation clock generated by the clock generation unit (4).

10 Claims, 12 Drawing Sheets

(58) Field of Classification Search
CPC ........ H04N 23/76; H04N 25/60; H04N 23/73; H04N 23/81; H04N 21/41407
USPC ........................................................ 348/159
See application file for complete search history.

(56) References Cited

FOREIGN PATENT DOCUMENTS

| | | | | |
|---|---|---|---|---|
| CN | 109255924 A | * | 1/2019 | ............ G01N 15/06 |
| JP | 06-334908 A | | 12/1994 | |
| JP | 2013-225826 A | | 10/2013 | |
| JP | 2014-026050 A | | 2/2014 | |

* cited by examiner

FIG.1
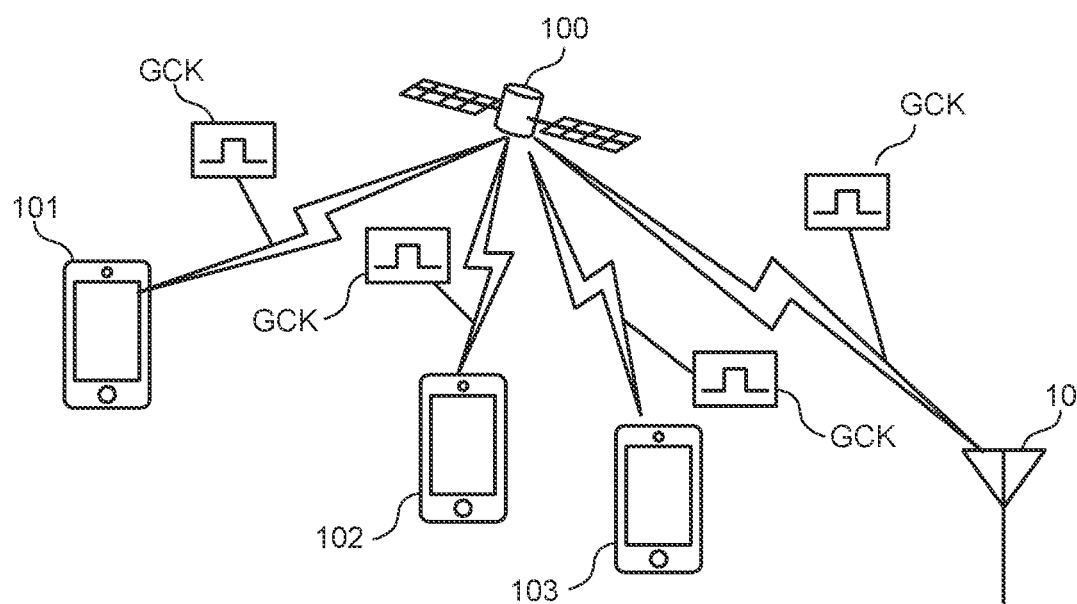
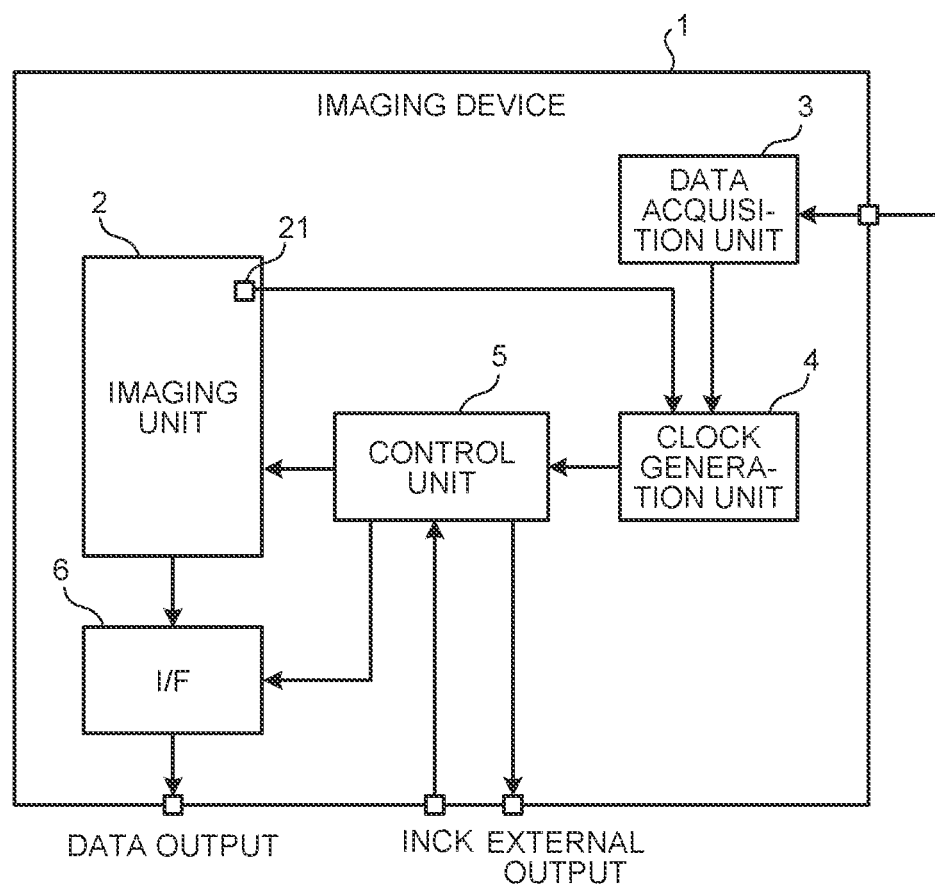

IMAGING DEVICE AND IMAGING METHOD

CROSS REFERENCE TO RELATED APPLICATIONS

This application is a U.S. National Phase of International Patent Application No. PCT/JP2020/029675 filed on Aug. 3, 2020, which claims priority benefit of Japanese Patent Application No. JP 2019-148507 filed in the Japan Patent Office on Aug. 13, 2019. Each of the above-referenced applications is hereby incorporated herein by reference in its entirety.

FIELD

The present disclosure relates to an imaging device and an imaging method.

BACKGROUND

In general, an imaging device captures an image by driving an imaging element at the timing synchronized with an internal clock having a predetermined fixed frequency (e.g., see Patent Literature 1).

CITATION LIST

Patent Literature

Patent Literature 1: JP H6-334908 A

SUMMARY

Technical Problem

An internal clock of an imaging device is, however, different for each imaging device. For that reason, the imaging device sometimes fail to capture an image in cooperation with other imaging devices.

The present disclosure thus proposes an imaging device and an imaging method capable of capturing an image in cooperation with other imaging devices.

Solution to Problem

According to the present disclosure, an imaging device is provided. The imaging device includes an imaging unit, a data acquisition unit, a clock generation unit, and a control unit. The imaging unit captures an image, and generates image data. The data acquisition unit acquires clock data related to an operation clock shared with other imaging devices. The clock generation unit generates the operation clock based on the clock data received by the data acquisition unit. The control unit controls the operation of the imaging unit based on the operation clock generated by the clock generation unit.

BRIEF DESCRIPTION OF DRAWINGS

FIG. 1 is a block diagram illustrating a configuration example of an imaging device according to the present disclosure.

DESCRIPTION OF EMBODIMENTS

Figure 2:
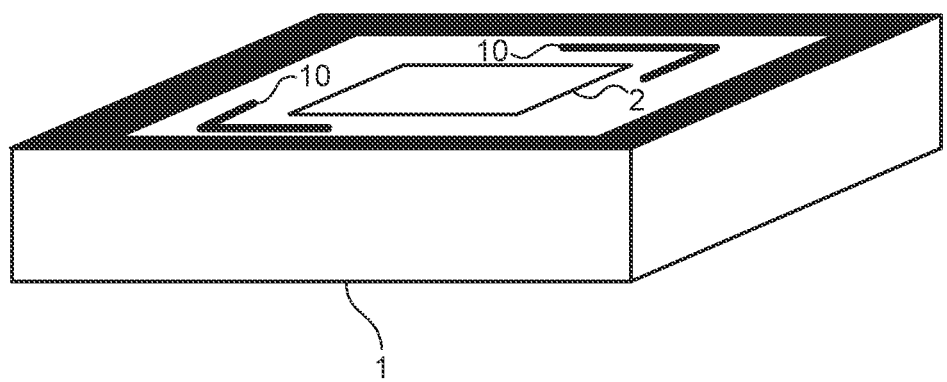
FIG. 2 is an explanatory view illustrating the arrangement of antennas of the imaging device according to the present disclosure.

An embodiment of the present disclosure will be described in detail below with reference to the drawings. Note that, in the following embodiment, the same reference signs are attached to the same parts to omit duplicate description. Although a case where an imaging device according to the present disclosure is provided in a smartphone will be described below, the imaging device according to the present disclosure is provided in any electronic device such as a digital still camera, a digital video camera, and a personal digital assistant (PDA) with a camera function.

[1. Configuration of Imaging Device]

FIG. 1 is a block diagram illustrating a configuration example of an imaging device 1 according to the present disclosure. As illustrated in FIG. 1, the imaging device 1 includes an imaging unit 2, a data acquisition unit 3, a clock generation unit 4, a control unit 5, and an interface (I/F) 6. The imaging unit 2 includes a plurality of two-dimensionally arranged imaging pixels, is controlled by the control unit 5, and captures an image by exposing each of the imaging pixels.

The imaging unit 2 generates image data by photoelectrically converting light from a subject received by each of the imaging pixels into signal charges in accordance with an amount of received light and performing analog-to-digital conversion from analog pixel signals in accordance with the signal charges to digital pixel signals. The imaging unit 2 outputs image data of a captured image from a data output terminal to, for example, an external memory and a display device via the I/F 6.

The data acquisition unit 3 is, for example, a global positioning system (GPS) receiver, and receives and acquires clock data related to an operation clock shared with other imaging devices 101 to 103 from a GPS satellite 100 via an antenna 10. The clock data includes a global clock GCK, time data, and the like. The global clock GCK is shared by a plurality of GPS satellites 100. The time data indicates an absolute time.

One example of the arrangement of the antennas 10 will be described here with reference to FIG. 2. FIG. 2 is an explanatory view illustrating the arrangement of antennas of the imaging device 1 according to the present disclosure. As illustrated in FIG. 2, the antennas 10 of the imaging device 1 are arranged around a light receiving region of the imaging unit 2.

The imaging device 1 has an opening for taking in external light at the location where the light receiving region of the imaging unit 2 is provided. As a result, the arrangement of the antennas 10 around the light receiving region of the imaging unit 2 in the imaging device 1 prevents radio waves transmitted from the GPS satellite 100 from being blocked by a housing and the like of the imaging device 1.

This allows the data acquisition unit 3 to reliably acquire clock data related to a global clock GCK common in the world. The data acquisition unit 3 outputs the acquired clock data to the clock generation unit 4. Note that the position where the antenna 10 is provided is not limited to the periphery of the light receiving region of the imaging unit 2 in FIG. 2. Any position may be adopted as long as the antenna 10 can receive signals transmitted from the GPS satellite 100.

Returning to FIG. 1, the clock generation unit 4 includes a phase locked loop (PLL) circuit, a compensation circuit, and the like. The PLL circuit generates an operation clock of the imaging device 1. The compensation circuit compensates the generated operation clock. The clock generation unit 4 generates the operation clock of the imaging device based on the clock data acquired by the data acquisition unit 3.

At this time, the clock generation unit 4 compensates the generated operation clock so that the generated operation clock synchronizes with an operation clock used by the other imaging devices 101 to 103. This allows the clock generation unit 4 to generate the same operation clock as the operation clock used by the other imaging devices 101 to 103.

For example, the clock generation unit 4 compensates the operation clock based on characteristics of each of circuit elements constituting the imaging device 1, an operation voltage, and the temperature of the imaging device 1 detected by a temperature sensor (not illustrated).

This allows the clock generation unit 4 to eliminate a phase shift between the operation clock of the imaging device 1 and the operation clock of the other imaging devices 101 to 103. The phase shift is caused by individual differences between circuit elements, operation speed changes due to fluctuations in operation voltage and temperature, and the like.

Furthermore, the clock generation unit 4 also compensates the difference between the time going speed in the GPS satellite 100 during high-speed movement and the time going speed on the ground. This allows the clock generation unit 4 to generate the operation clock of the imaging device 1, which accurately synchronizes with the operation clock of the other imaging devices 101 to 103. The clock generation unit 4 outputs the generated operation clock and time data indicating an absolute time included in the clock data to the control unit 5.

The control unit 5 includes, for example, a microcomputer and various circuits. The microcomputer includes a central processing unit (CPU), a read only memory (ROM), a random access memory (RAM), and the like. Note that the control unit 5 may include hardware such as an application specific integrated circuit (ASIC) and a field programmable gate array (FPGA).

The CPU uses the RAM as a work area, and executes an information processing program stored in the ROM. The control unit 5 thereby controls the operation of the imaging unit 2 based on the operation clock generated by the clock generation unit 4.

This allows the control unit 5 to capture an image in cooperation with the other imaging devices 101 to 103 at completely synchronized timing. Uses in the case where the imaging device 1 captures an image in cooperation with the imaging devices 101 to 103 or the like will be described later with reference to FIGS. 4 to 7. Note that, in the case where the operation clock is not input from the clock generation unit 4, the control unit 5 can also control the imaging unit 2 based on an internal clock (INCK) input from an input terminal.

Furthermore, the control unit 5 outputs the time data input from the clock generation unit 4 to the I/F 6, adds time data at the time when an image has been captured to image data generated by the imaging unit 2, and outputs the image data to the outside of the imaging device 1. One example of uses of the time data added to the image data will be described later with reference to FIG. 5. Furthermore, the control unit 5 can also output the operation clock input from the clock generation unit 4 to the outside. Note that the imaging device 1 is not required to include an external port that outputs an operation clock to the outside.

For example, the above-described imaging device 1 cannot acquire clock data from the GPS satellite 100 in an environment where radio waves cannot be received, such as indoors. Thus, the imaging device 1 includes a detection pixel 21 that detects flickering light. The clock generation unit 4 then generates the operation clock based on the flickering light detected by the detection pixel 21.

Figure 3:
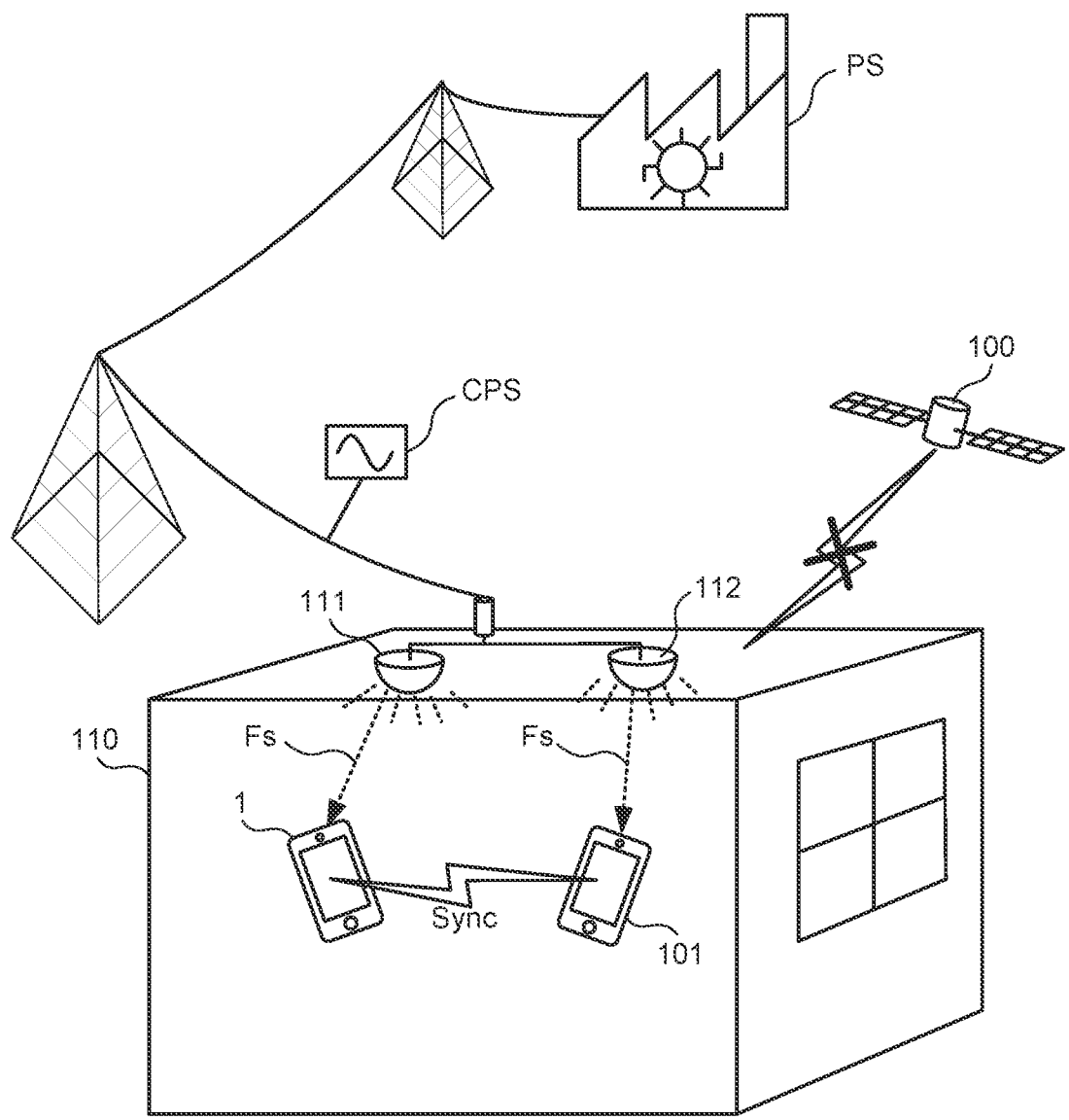
FIG. 3 is an explanatory diagram illustrating a situation in which an operation clock is generated based on flickering light according to the present disclosure.

A situation in which the operation clock is generated based on the flickering light will be described here with reference to FIG. 3. FIG. 3 is an explanatory diagram illustrating a situation in which an operation clock is generated based on flickering light according to the present disclosure.

As illustrated in FIG. 3, for example, when the imaging device 1 and the other imaging device 101 are inside a building 110, these imaging devices cannot receive radio waves from the GPS satellite 100, and thus cannot acquire clock data.

Thus, the imaging device 1 and the other imaging device 101 include the detection pixel 21 (see FIG. 1) that detects, for example, flickering light Fs emitted from flicker light sources 111 and 112. The flickering light Fs flickers in accordance with the frequency of a commercial power source CPS supplied from a power company PS.

The detection pixels 21 of the imaging device 1 and the other imaging device 101 output information indicating the light receiving timing of the flickering light Fs to the clock generation unit 4 (see FIG. 1). The clock generation units 4 of the imaging device 1 and the other imaging device 101 generate the operation clock based on the flickering cycle of the flickering light Fs detected by the detection pixels 21.

This allows the imaging device 1 to capture an image in cooperation with the other imaging device 101 since the imaging device 1 can synchronize with the other imaging device 101 by operating based on the operation clock generated by the clock generation unit 4.

Note that the flickering cycle of the flickering light Fs may be disturbed, for example, when noise is superimposed on the commercial power source CPS. Note, however, that the power company PS determines the frequency of the commercial power source CPS for each area.

Thus, the clock generation unit 4 compensates the operation clock based on the frequency of the commercial power source CPS determined in the area based on the current position (area) of the imaging device 1. This allows the clock generation unit 4 to generate an operation clock synchronized with the frequency of the commercial power source CPS even when noise is superimposed on the commercial power source CPS.

Furthermore, in the example in FIG. 1, the detection pixel 21 is provided in an imaging region where imaging pixels for capturing an image of the imaging unit 2 are arranged. That is, the imaging device 1 uses a part of the imaging pixels as the detection pixels 21. This allows the imaging device 1 to inhibit an increase in cost since the detection pixel 21 is not required to be separately provide for detecting the flickering light Fs.

Note that the detection pixel 21 may be provided outside the imaging region where imaging pixels for capturing an image of the imaging unit 2 are arranged. Such a configuration allows the imaging device 1 to capture an image by using all the imaging pixels in the imaging region, so that the image can be captured with high quality.

[2. Uses of Imaging Device]

Next, uses of the imaging device 1 according to the present disclosure will be described with reference to FIGS. 4 to 7. FIGS. 4 to 7 are explanatory diagrams illustrating uses of the imaging device according to the present disclosure.

Figure 4:
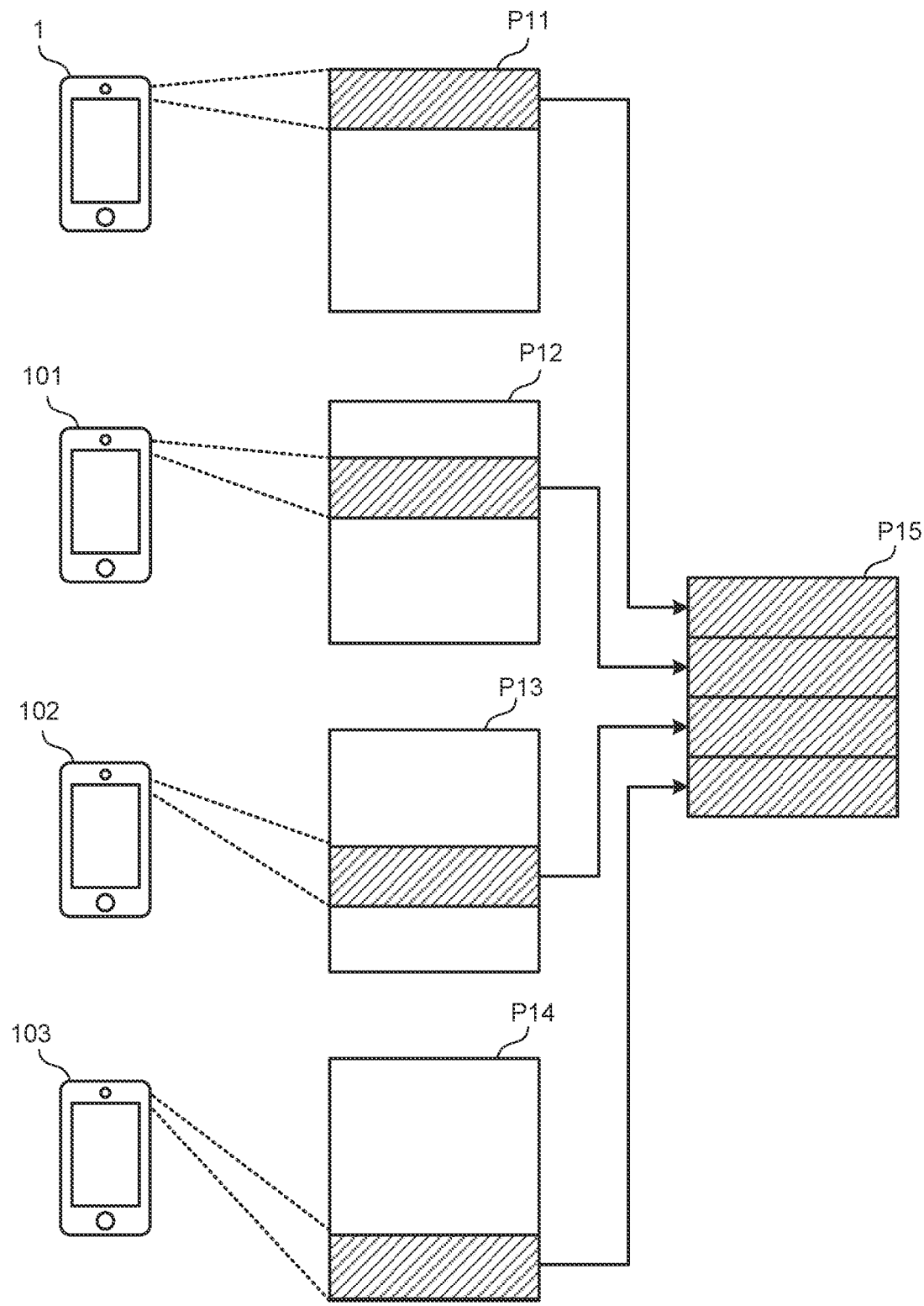
FIG. 4 is an explanatory diagram illustrating a use of the imaging device according to the present disclosure.

For example, as illustrated in FIG. 4, the imaging device 1 simultaneously images the same subject by using an operation clock common to the other imaging devices 101 to 103. Then, the image reading timings in the four imaging devices 1, 101 to 103 are shifted little by little.

For example, a partial image P11 of the uppermost stage among partial images P11 to P14 obtained by dividing a captured image into four in the vertical direction is read from the imaging device 1. The partial image P12 of the second stage from the top is read from the other imaging device 101.

Furthermore, the partial image P13 of the second stage from the bottom is read from the other imaging device 102. The partial image P14 of the lowermost stage is read from the other imaging device 103. Then, for example, an image synthesizing device combines the four partial images P11 to P14 to generate a synthesized image P15.

This allows inhibition of subject distortion due to a decrease in the number of global shutters and capturing of an image as if simulatively captured by a global shutter method even when the four imaging devices 1, 101 to 103 adopt a rolling shutter method.

Furthermore, when the number of horizontal lines of a captured image is N, N imaging devices capture N partial images to generate a synthesized image, which minimizes the influence of a rolling shutter.

Figure 5:
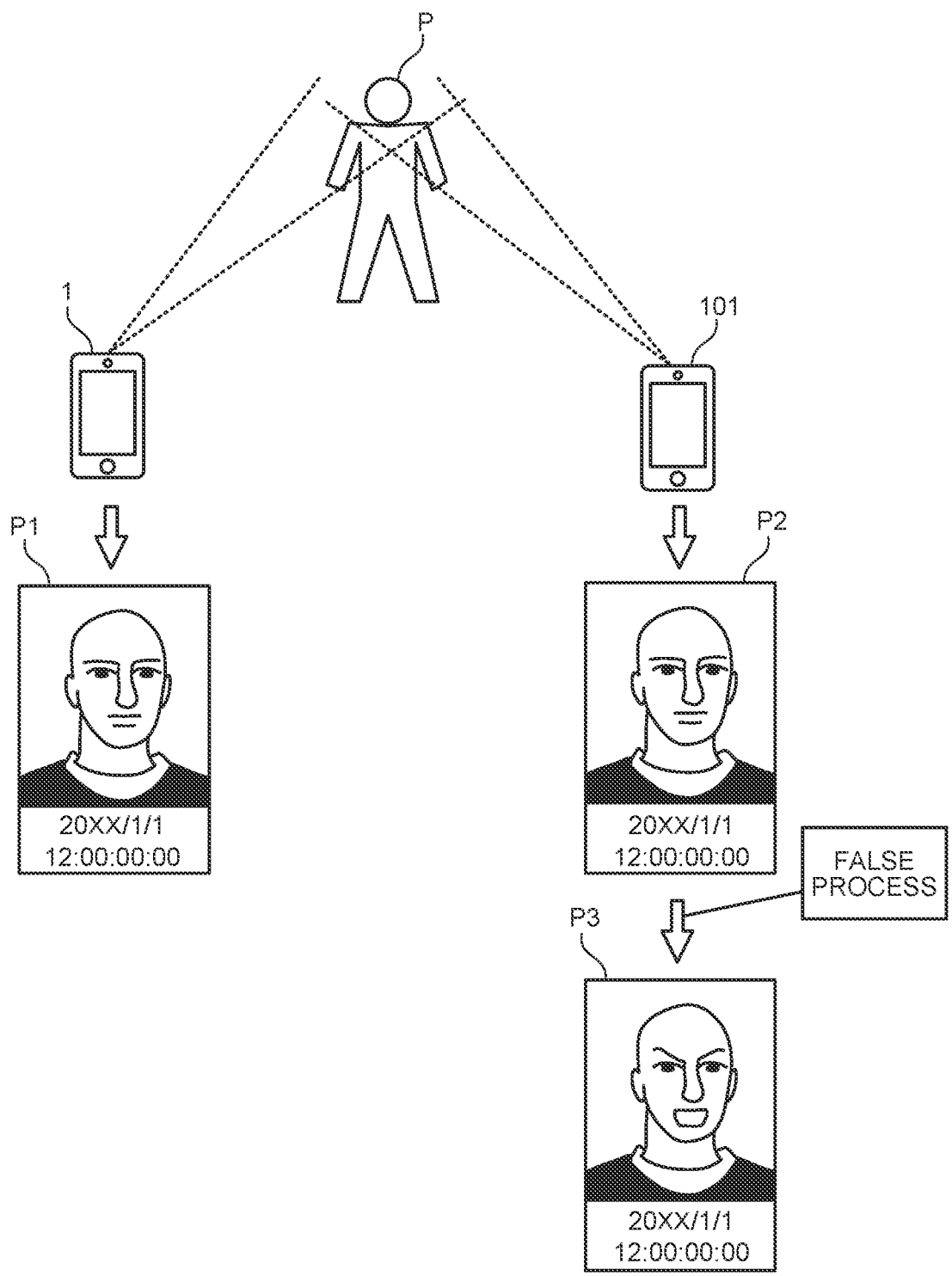
FIG. 5 is an explanatory diagram illustrating the use of the imaging device according to the present disclosure.

Furthermore, as illustrated in FIG. 5, when the imaging device 1 and the other imaging device 101 use a common operation clock to image the same subject P at the same time, the imaging device 1 and the other imaging device 101 adds time data indicating an absolute time to each of captured images P1 and P2.

The fact that both the captured images P1 and P2 are captured accurately at the same time is thereby ensured by the captured image P1 and time data and the captured image P2 and time data. The imaging device 1 has captured the captured image P1. The other imaging device 101 has captured the captured image P2.

Furthermore, for example, when the captured image P2 captured by the other imaging device 101 is falsely processed to generate a processed image P3, it is possible to verify that any one of the captured image P1 and the processed image P3 has been falsely processed by collating the captured image P1, the processed image P3, and time data.

Furthermore, when the two imaging devices 1 are mounted in one smartphone, the two imaging devices 1 use a common operation clock and simultaneously capture images, whereby the two imaging devices 1 can mutually ensure that both the captured images have been captured accurately at the same time.

Furthermore, for example, the number of automatic driving vehicles equipped with a light detection and ranging (LiDAR) is expected to increase in the future. The LiDAR is a device that applies laser light emitted in a pulse form to the surroundings, receives laser light reflected from an object, and analyzes a distance to the object and the like.

This causes a problem that, when exposure timing of the imaging device 1 and light emission timing of the LiDAR accidentally coincide with each other, the imaging device 1 receives strong laser light from the LiDAR, and cannot image a subject.

Figure 6:
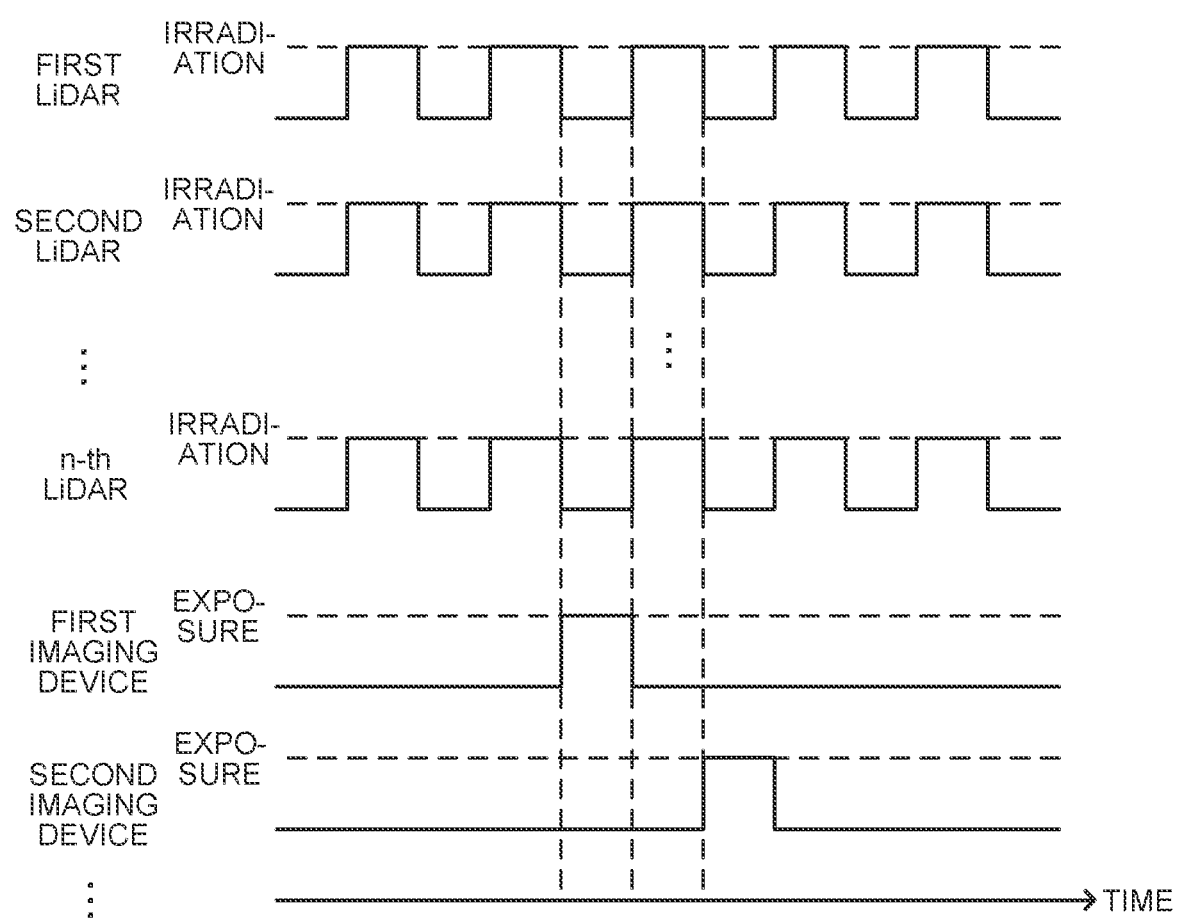
FIG. 6 is an explanatory diagram illustrating the use of the imaging device according to the present disclosure.

Thus, the above-described problem is solved by operating all the imaging devices 1 and all the LiDARs with a common operation clock. For example, as illustrated in FIG. 6, the first to n-th LiDARs intermittently apply laser light at the same timing by using the same operation clock.

In contrast, for example, the first imaging device uses the same operation clock as the operation clock used by all the LiDARs, and performs exposure within a non-irradiation period of laser light of all the LiDARs, whereby the first imaging device can image a subject without receiving laser light. Furthermore, the second imaging device can similarly image the subject without receiving laser light by performing exposure within a non-irradiation period of laser light of all the LiDARs.

Figure 7:
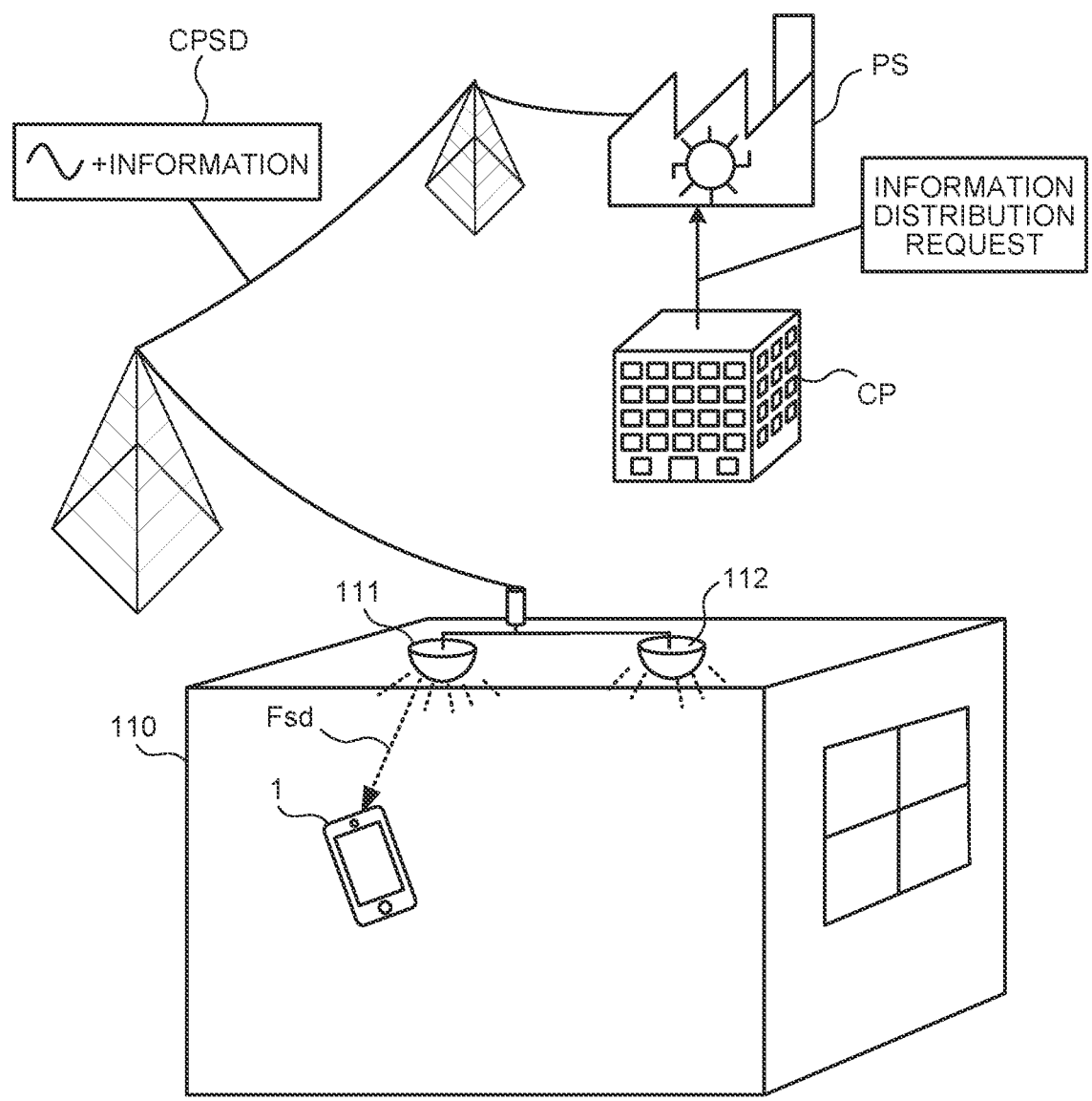
FIG. 7 is an explanatory diagram illustrating the use of the imaging device according to the present disclosure.

Furthermore, when the imaging device 1 operates based on an operation clock, which is generated based on the flickering cycle of the flickering light Fs, the imaging device 1 can perform, for example, communication in FIG. 7 by using light emitted from the flicker light sources 111 and 112. The flickering light Fs is detected by the detection pixel 21 in FIG. 3.

Note that the same components as those in FIG. 3 among components in FIG. 7 are denoted by the same reference signs as those in FIG. 3, and duplicate description will thereby be omitted here. As illustrated in FIG. 6, for example, an information providing company CP requests the power company PS to distribute information.

The power company PS modulates information, which the information providing company CP has requested the power company PS to distribute, into a signal synchronized with the frequency of a commercial power source, superimposes the signal on the commercial power source, and supplies the commercial power source to the building 110 as an information-added commercial power source CPSD.

This allows the imaging device 1 to receive information provided from the information providing company CP by receiving flickering light Fsd emitted from the flicker light source 111 and demodulating the modulated information. Furthermore, the other imaging devices 101 to 103 using the same operation clock as the imaging device 1 can similarly receive information provided from the information providing company CP.

Furthermore, for example, the imaging device 1 can transmit information to the other imaging device 101 by causing flash to flicker toward the other imaging device 101 using the same operation clock as that of the imaging device 1 as Morse code at the timing synchronized with the operation clock.

[3. Processing Executed by Imaging Device]

Figure 8:
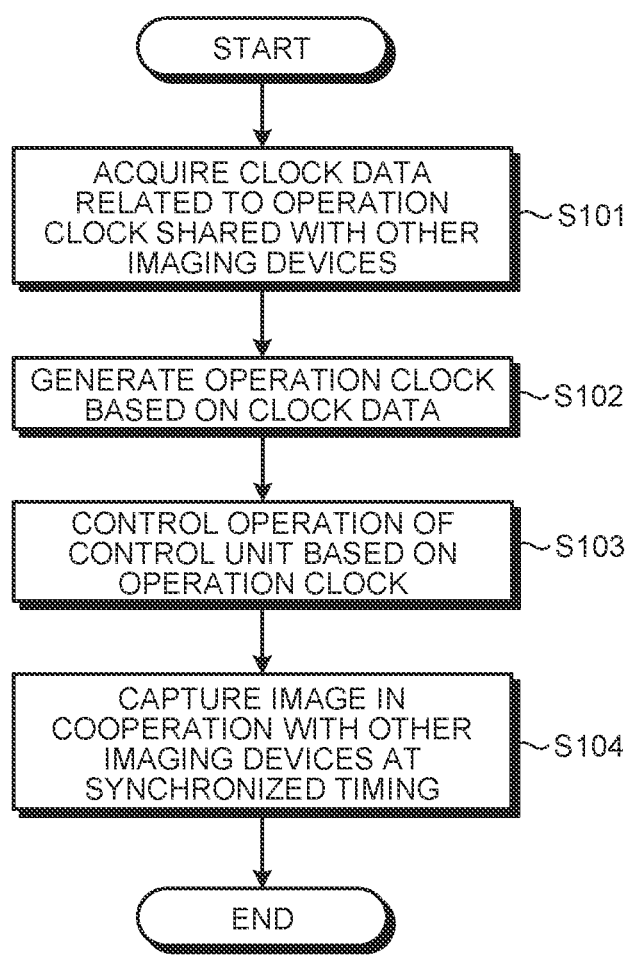
FIG. 8 is a flowchart illustrating one example of processing executed by the imaging device according to the present disclosure.

Next, processing executed by the imaging device 1 according to the present disclosure will be described with reference to FIG. 8. FIG. 8 is a flowchart illustrating one example of the processing executed by the imaging device according to the present disclosure.

As illustrated in FIG. 8, the imaging device 1 causes the data acquisition unit 3 to acquire clock data related to an operation clock shared with the other imaging devices 101 to 103 (Step S101). The imaging device 1 then causes the clock generation unit 4 to generate the operation clock based on the clock data (Step S102).

The imaging device 1 subsequently controls the operation of the imaging unit 2 based on the operation clock (Step S103). The imaging device 1 then captures an image in cooperation with the other imaging devices 101 to 103 at the timing synchronized with the other imaging devices 101 to 103 (Step S104), and ends the processing.

[4. Example of Application to Moving Object]

The technology according to the present disclosure (present technology) can be applied to various products. For example, the technology according to the present disclosure may be achieved as a device mounted in a moving object of any type of an automobile, an electric vehicle, a hybrid electric vehicle, a motorcycle, a bicycle, a personal mobility, an airplane, a drone, a ship, a robot, and the like.

Figure 9:
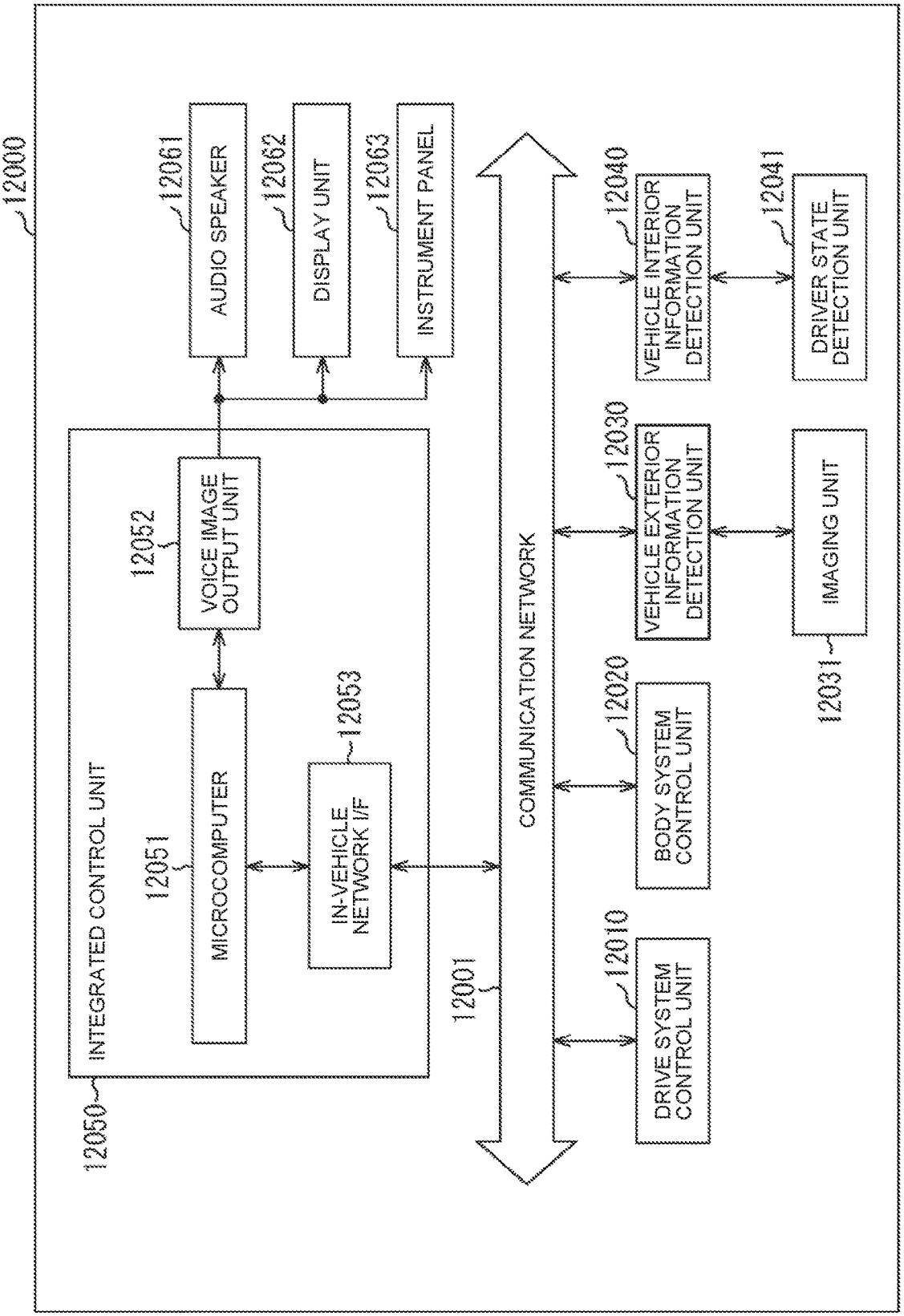
FIG. 9 is a block diagram illustrating one example of a schematic configuration of a vehicle control system.

FIG. 9 is a block diagram illustrating an example of a schematic configuration of a vehicle control system. The vehicle control system is one example of a moving object control system to which the technology according to the present disclosure can be applied.

A vehicle control system 12000 includes a plurality of electronic control units connected via a communication network 12001. In the example in FIG. 9, the vehicle control system 12000 includes a drive system control unit 12010, a body system control unit 12020, a vehicle exterior information detection unit 12030, a vehicle interior information detection unit 12040, and an integrated control unit 12050. Furthermore, a microcomputer 12051, a voice image output unit 12052, and an in-vehicle network interface (I/F) 12053 are illustrated as functional configurations of the integrated control unit 12050.

The drive system control unit 12010 controls the operation of a device related to a drive system of a vehicle in accordance with various programs. For example, the drive system control unit 12010 functions as a control device for a drive force generation device, a drive force transmission mechanism, a steering mechanism, a braking device, and the like. The drive force generation device generates vehicle drive force, and includes an internal combustion engine, a drive motor, and the like. The drive force transmission mechanism transmits the drive force to a wheel. The steering mechanism adjusts a steering angle of the vehicle. The braking device generates braking force of the vehicle.

The body system control unit 12020 controls operations of various devices mounted in a vehicle body in accordance with the various programs. For example, the body system control unit 12020 functions as a control device for a keyless entry system, a smart key system, a power window device, and various lamps such as a headlamp, a back lamp, a brake lamp, a blinker, and a fog lamp. In this case, radio waves transmitted from a portable device substituted for a key or signals of various switches can be input to the body system control unit 12020. The body system control unit 12020 receives inputs of the radio waves or signals, and controls a door lock device, a power window device, a lamp, and the like of the vehicle.

The vehicle exterior information detection unit 12030 detects information outside a vehicle mounted with the vehicle control system 12000. For example, an imaging unit 12031 is connected to the vehicle exterior information detection unit 12030. The vehicle exterior information detection unit 12030 causes the imaging unit 12031 to capture an image of the outside of the vehicle, and receives data of the captured image. The vehicle exterior information detection unit 12030 may perform object detection processing or distance detection processing for a person, a vehicle, an obstacle, a sign, a character on a road, and the like based on the received image.

The imaging unit 12031 is an optical sensor that receives light and outputs an electric signal in accordance with the amount of the received light. The imaging unit 12031 can output an electric signal as an image or as distance measurement information. Furthermore, light received by the imaging unit 12031 may be visible light or invisible light such as infrared rays.

The vehicle interior information detection unit 12040 detects information on the inside of the vehicle. For example, a driver state detection unit 12041 is connected to the vehicle interior information detection unit 12040. The driver state detection unit 12041 detects the state of a driver. The driver state detection unit 12041 includes a camera that images, for example, a driver. The vehicle interior information detection unit 12040 may calculate the degree of fatigue or concentration of the driver or may determine whether the driver is falling asleep based on the detection information input from the driver state detection unit 12041.

The microcomputer 12051 can calculate a control target value of the drive force generation device, the steering mechanism, or the braking device based on information on the inside or outside of the vehicle acquired by the vehicle exterior information detection unit 12030 or the vehicle interior information detection unit 12040, and output a control command to the drive system control unit 12010. For example, the microcomputer 12051 can perform cooperative control for implementing a function of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, and the like.

Furthermore, the microcomputer 12051 can perform cooperative control for the purpose of automatic driving in which autonomous traveling is performed without depending on the operation of the driver by controlling the drive force generation device, the steering mechanism, the braking device, and the like based on the information on the surroundings of the vehicle acquired by the vehicle exterior information detection unit 12030 and the vehicle interior information detection unit 12040.

Furthermore, the microcomputer 12051 can output a control command to the body system control unit 12020 based on vehicle exterior information acquired by the vehicle exterior information detection unit 12030. For example, the microcomputer 12051 can perform cooperative control for preventing glare, such as controlling a headlamp in accordance with the position of a preceding vehicle or an oncoming vehicle detected by the vehicle exterior information detection unit 12030 and switching beams from high to low.

The voice image output unit 12052 transmits an output signal of at least one of voice and an image to an output device capable of visually or auditorily notifying an occupant of the vehicle or the outside of the vehicle of information. In the example of FIG. 9, an audio speaker 12061, a display unit 12062, and an instrument panel 12063 are illustrated as the output devices. The display unit 12062 may include at least one of, for example, an on-board display and a head-up display.

Figure 10:
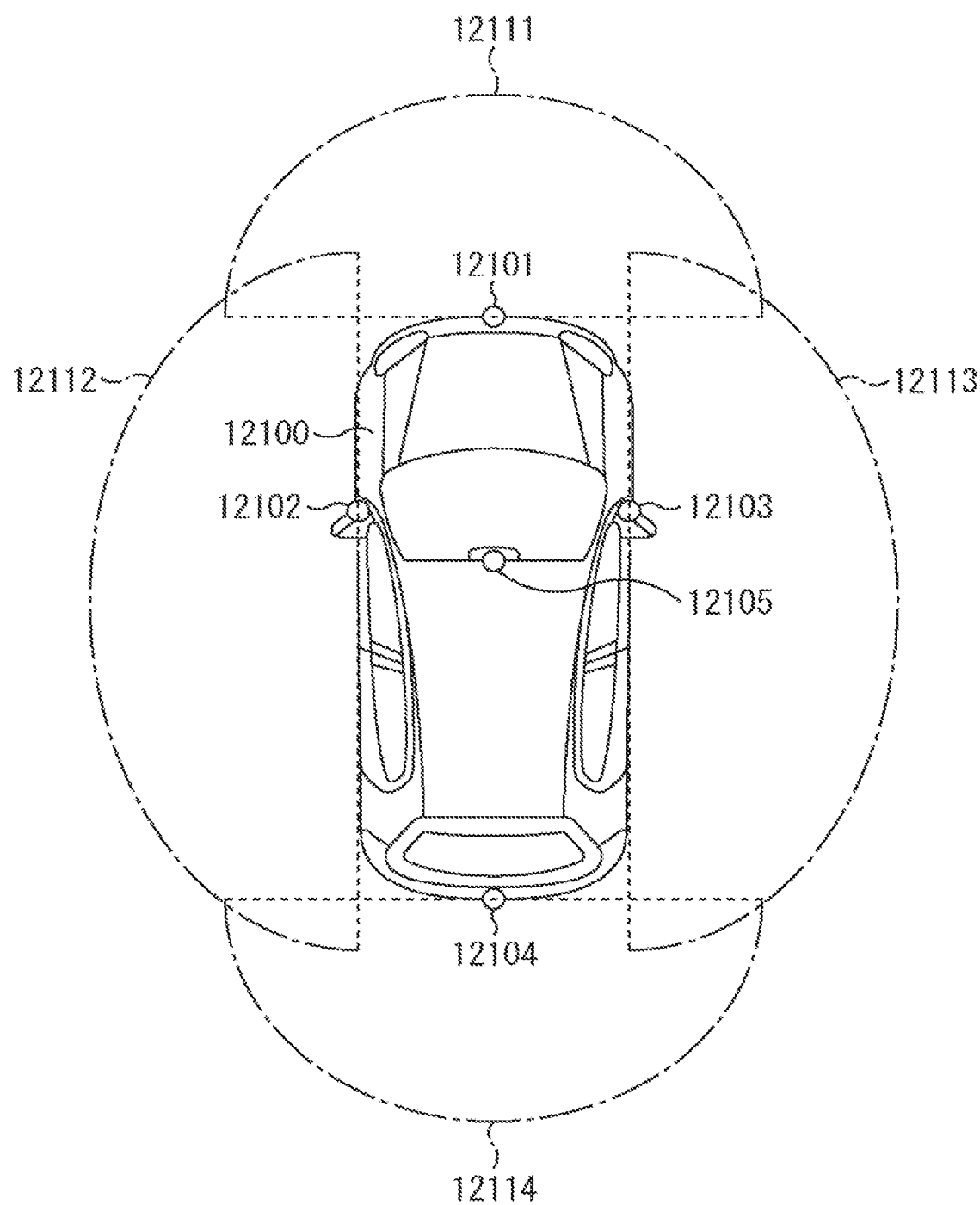
FIG. 10 is an explanatory view illustrating one example of installation positions of a vehicle exterior information detection unit and an imaging unit.

FIG. 10 illustrates an example of an installation position of the imaging unit 12031.

In FIG. 10, a vehicle 12100 includes imaging units 12101, 12102, 12103, 12104, and 12105 as the imaging units 12031.

The imaging units 12101, 12102, 12103, 12104, and 12105 are provided at positions of a front nose, a side mirror, a rear bumper, a back door, and an upper portion of a vehicle interior windshield of the vehicle 12100, for example. The imaging units 12101 and 12105 mainly acquire an image of the front of the vehicle 12100. The imaging unit 12101 is provided on the front nose. The imaging unit 12105 is provided at the upper portion of the vehicle interior windshield. The imaging units 12102 and 12103 mainly acquire an image of the side of the vehicle 12100. The imaging units 12102 and 12103 are provided on the side mirror. The imaging unit 12104 mainly acquires an image of the rear of the vehicle 12100. The imaging unit 12104 is provided in the rear bumper or the back door. The front images acquired by the imaging units 12101 and 12105 are mainly used for detecting a preceding vehicle, a pedestrian, an obstacle, a traffic light, a traffic sign, a lane, and the like.

Note that FIG. 10 illustrates one example of imaging ranges of the imaging units 12101 to 12104. An imaging range 12111 is an imaging range of the imaging unit 12101 provided on the front nose. Imaging ranges 12112 and 12113 are imaging ranges of the imaging units 12102 and 12103 provided at the side mirrors. An imaging range 12114 is an imaging range of the imaging unit 12104 provided on the rear bumper or the back door. For example, an overhead image of the vehicle 12100 viewed from above can be obtained by superimposing pieces of data of images captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element including pixels for detecting phase difference.

For example, the microcomputer 12051 can extract a solid object, which runs most closely on an advancing road of the vehicle 12100 and travels at a predetermined speed (e.g., 0 km/h or more) in substantially the same direction as the vehicle 12100, as a preceding vehicle by determining distances to objects in the imaging ranges 12111 to 12114 and temporal changes in the distances (relative speed to the vehicle 12100) based on distance information obtained from the imaging units 12101 to 12104. Moreover, the microcomputer 12051 can set an inter-vehicle distance to be preliminarily secured in front of the preceding vehicle, and perform automatic brake control (including follow-up stop control), automatic acceleration control (including follow-up start control), and the like. As described above, it is possible to perform cooperative control for automatic driving and the like in which autonomous traveling is performed without depending on the operation of a driver.

For example, the microcomputer 12051 can classify solid object data related to a solid object into two-wheeled vehicles, ordinary vehicles, large vehicles, pedestrians, and other solid objects such as utility poles, and extract some data based on distance information obtained by the imaging units 12101 to 12104 to automatically avoid obstacles. For example, the microcomputer 12051 classifies obstacles around the vehicle 12100 into obstacles that can be visually recognized by a driver of the vehicle 12100 and obstacles that are difficult to be visually recognized. Then, the microcomputer 12051 determines a collision risk indicating the degree of a risk of collision against each obstacle. When collision is likely to occur at a collision risk of a set value or more, the microcomputer 12051 can support driving to avoid the collision by outputting an alarm to the driver via the audio speaker 12061 and the display unit 12062 and performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not images captured by the imaging units 12101 to 12104 have the pedestrian. Such pedestrian recognition is performed by, for example, a procedure of extracting feature points in the images captured by the imaging units 12101 to 12104 serving as infrared cameras and a procedure of performing pattern matching processing on a series of feature points indicating the outline of an object to determine whether or not the object is a pedestrian. When the microcomputer 12051 determines that the images captured by the imaging units 12101 to 12104 have a pedestrian and recognizes the pedestrian, the voice image output unit 12052 controls the display unit 12062 so that the display unit 12062 superimposes and displays a square contour line to emphasize the recognized pedestrian. Furthermore, the voice image output unit 12052 may control the display unit 12062 to display an icon or the like indicating a pedestrian at a desired position.

One example of the vehicle control system to which the technology according to the present disclosure can be applied has been described above. The technology according to the present disclosure can be applied to, for example, the imaging unit 12031 among the above-described configurations. For example, the imaging device 1 in FIG. 1 can be applied to the imaging unit 12031. If the technology according to the present disclosure is applied to the imaging unit 12031, an image of the moment of a traffic accident is captured by the imaging units 12031 mounted in a plurality of vehicles traveling around at completely the same timing, whereby the captured image can be used for accurately verifying the traffic accident.

[5. Example of Application to Endoscopic Surgery System]

Furthermore, the technology according to the present disclosure may be applied to an endoscopic surgery system.

Figure 11:
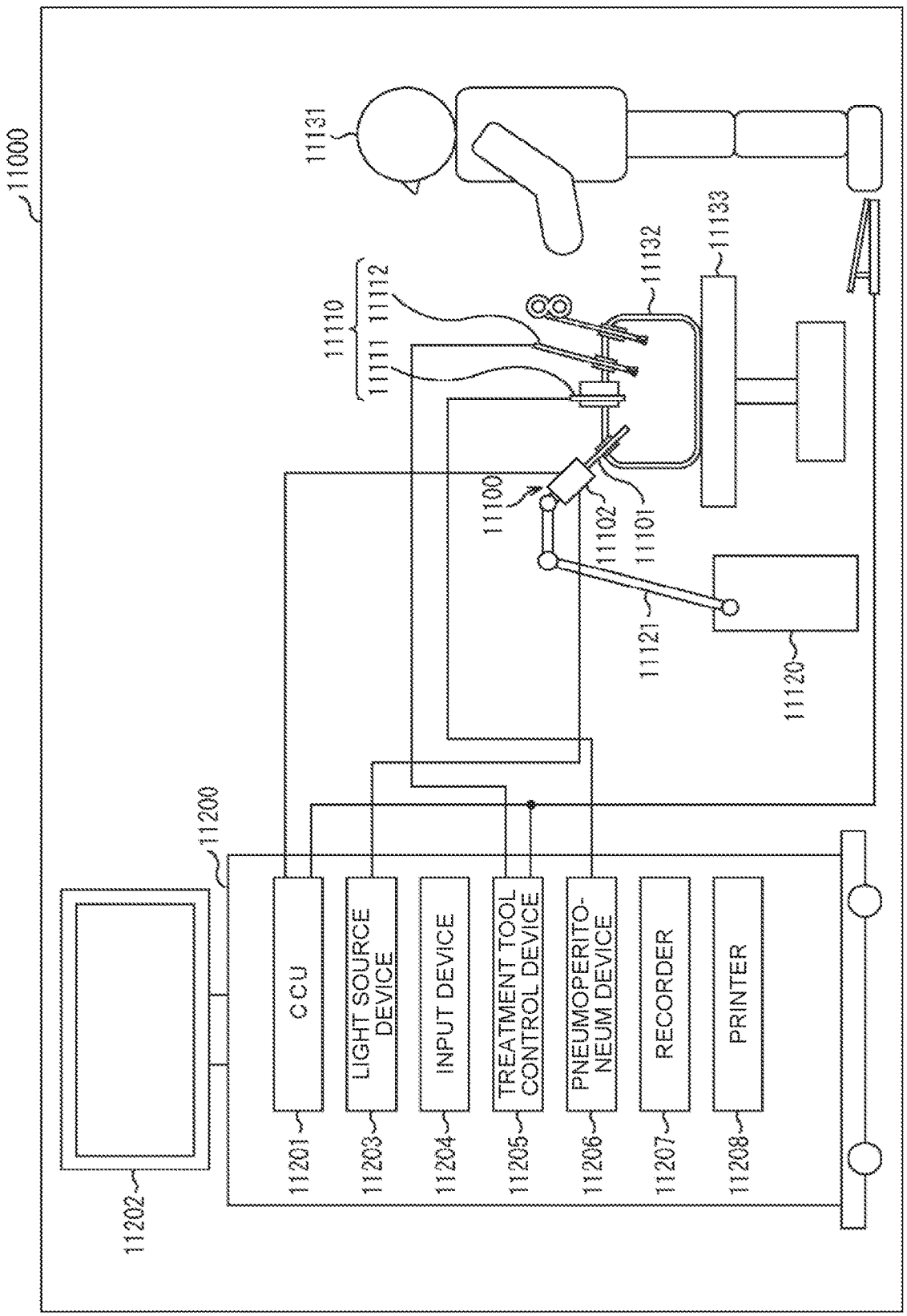
FIG. 11 illustrates one example of a schematic configuration of an endoscopic surgery system.

FIG. 11 illustrates one example of a schematic configuration of an endoscopic surgery system to which the technology according to the present disclosure (present technology) can be applied.

FIG. 11 illustrates a state in which an operator (doctor) 11131 is performing surgery on a patient 11132 on a patient bed 11133 by using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120, and a cart 11200. The support arm device 11120 supports the endoscope 11100. Various devices for endoscopic surgery are mounted in the cart 11200.

The endoscope 11100 includes a lens barrel 11101 and a camera head 11102. A region of a predetermined length from the distal end of the lens barrel 11101 is inserted into the body cavity of the patient 11132. The camera head 11102 is connected to the proximal end of the lens barrel 11101. Although the example illustrates the endoscope 11100 configured as a so-called rigid scope having the rigid lens barrel 11101, the endoscope 11100 may be configured as a so-called flexible scope having a flexible lens barrel.

An opening portion, into which an objective lens is fitted, is provided at the distal end of the lens barrel 11101. A light source device 11203 is connected to the endoscope 11100. Light generated by the light source device 11203 is guided to the distal end of the lens barrel by a light guide extending inside the lens barrel 11101, and is applied to an object to be observed in the body cavity of the patient 11132 via the objective lens. Note that the endoscope 11100 may be a forward-viewing endoscope, an oblique-viewing endoscope, or a side-viewing endoscope.

An optical system and an imaging element are provided inside the camera head 11102. The optical system collects reflected light (observation light) from the object to be observed on the imaging element. The imaging element photoelectrically converts the observation light, and generates an electric signal corresponding to the observation light, that is, an image signal corresponding to an observation image. The image signal is transmitted to a camera control unit (CCU) 11201 as RAW data.

The CCU 11201 includes a central processing unit (CPU), a graphics processing unit (GPU), and the like, and integrally controls the operations of the endoscope 11100 and a display device 11202. Moreover, the CCU 11201 receives an image signal from the camera head 11102, and performs various pieces of image processing for displaying an image based on the image signal, such as development processing (demosaic processing), on the image signal.

The display device 11202 displays an image based on the image signal, on which the CCU 11201 has performed image processing, under the control of the CCU 11201.

The light source device 11203 includes a light source such as a light emitting diode (LED), and supplies irradiation light for imaging a surgical site and the like to the endoscope 11100.

An input device 11204 is an input interface for the endoscopic surgery system 11000. A user can input various pieces of information and instructions to the endoscopic surgery system 11000 via the input device 11204. For example, the user inputs an instruction and the like to change imaging conditions (type, magnification, focal length, and the like of irradiation light) of the endoscope 11100.

A treatment tool control device 11205 controls driving of the energy treatment tool 11112 for cauterization and incision of tissues, sealing of a blood vessel, and the like. In order to secure a visual field of the endoscope 11100 and working space of an operator, a pneumoperitoneum device 11206 feeds gas into the body cavity of the patient 11132 via the pneumoperitoneum tube 11111 for inflating the body cavity. A recorder 11207 is a device capable of recording various pieces of information regarding surgery. A printer 11208 is a device capable of printing the various pieces of information regarding surgery in various formats such as text, an image, and a graph.

Note that the light source device 11203 can include an LED, a laser light source, and a white light source. The light source device 11203 supplies irradiation light for imaging a surgical site to the endoscope 11100. The white light source is configured by a combination of the LED and the laser light source. When the white light source includes a combination of RGB laser light sources, the output intensity and output timing of each color (each wavelength) can be controlled with high accuracy, so that the light source device 11203 can adjust the white balance of a captured image. Furthermore, in this case, an image corresponding to each of RGB can be captured in a time division manner by applying laser light from each of the RGB laser light sources to an object to be observed in the time division manner and controlling driving of an imaging element of the camera head 11102 in synchronization with the irradiation timing. According to this method, a color image can be obtained without providing a color filter in the imaging element.

Furthermore, the driving of the light source device 11203 may be controlled so as to change the intensity of light to be output every predetermined time. An image of a high dynamic range without so-called black defects and halation can be generated by controlling driving of the imaging element of the camera head 11102 in synchronization of the timing of change in the intensity of the light, acquiring an image in a time division manner, and synthesizing the image.

Furthermore, the light source device 11203 may be configured to be able to supply light in a predetermined wavelength band supporting special light observation. In the special light observation, for example, so-called narrow band imaging, in which a predetermined tissue such as a blood vessel in a mucosal surface layer is captured with a high contrast, is performed by, for example, using the wavelength dependency of light absorption in a body tissue and applying light in a narrower band than irradiation light (i.e., white light) at the time of usual observation. Alternatively, in the special light observation, fluorescence observation for obtaining an image by fluorescence generated by application of excitation light may be performed. In the fluorescence observation, it is possible to apply excitation light to a body tissue and observe fluorescence from the body issue (autofluorescence observation) or to obtain a fluorescent image by locally injecting a reagent such as indocyanine green (ICG) to the body tissue and applying excitation light corresponding to a fluorescence wavelength of the reagent to the body tissue. The light source device 11203 can be configured to be able to supply narrow band light and/or excitation light that supports such special light observation.

Figure 12:
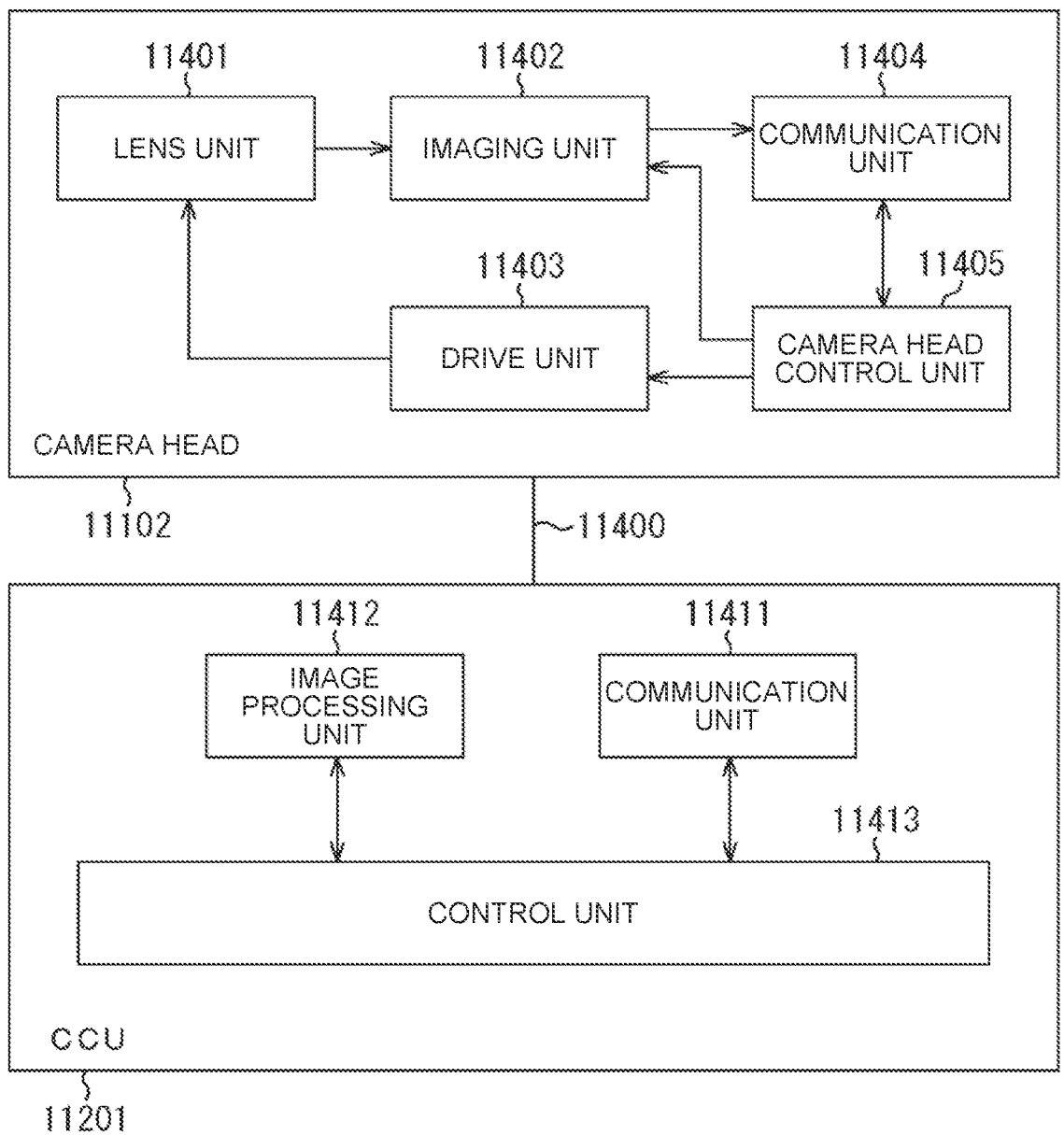
FIG. 12 is a block diagram illustrating one example of the functional configurations of a camera head and a CCU.

FIG. 12 is a block diagram illustrating one example of functional configurations of the camera head 11102 and the CCU 11201 in FIG. 11.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are connected so as to communicate with each other by a transmission cable 11400.

The lens unit 11401 is an optical system provided at a connection portion with the lens barrel 11101. Observation light taken in from the distal end of the lens barrel 11101 is guided to the camera head 11102, and enters the lens unit 11401. The lens unit 11401 is configured by combining a plurality of lenses including a zoom lens and a focus lens.

The imaging unit 11402 includes an imaging element. One imaging element (so-called single-plate type) constituting the imaging unit 11402 or a plurality of imaging elements (so-called multi-plate type) may be provided. When the imaging unit 11402 is configured as being of a multi-plate type, for example, each of the imaging elements generates an image signal corresponding to each of RGB. A color image may be obtained by combining the image signals. Alternatively, the imaging unit 11402 may include a pair of imaging elements for acquiring image signals for each of a right eye and a left eye, which supports three-dimensional (3D) display. The 3D display allows an operator 11131 to accurately grasp the depth of a living tissue in a surgical site. Note that, when the imaging unit 11402 is of multi-plate type, a plurality of lens units 11401 can be provided in accordance with imaging elements.

Furthermore, the imaging unit 11402 is not necessarily required to be provided in the camera head 11102. For example, the imaging unit 11402 may be provided immediately behind the objective lens inside the lens barrel 11101.

The drive unit 11403 includes an actuator, and moves the zoom lens and the focus lens of the lens unit 11401 by a predetermined distance along the optical axis under the control of the camera head control unit 11405. This allows the magnification and focus of an image captured by the imaging unit 11402 to be appropriately adjusted.

The communication unit 11404 includes a communication device for transmitting and receiving various pieces of information to and from the CCU 11201. The communication unit 11404 transmits an image signal obtained from the imaging unit 11402 as RAW data to the CCU 11201 via the transmission cable 11400.

Furthermore, the communication unit 11404 receives a control signal for controlling driving of the camera head 11102 from the CCU 11201, and supplies the control signal to the camera head control unit 11405. The control signal includes, for example, information regarding imaging conditions such as information for designating a frame rate of a captured image, information for designating an exposure value at the time of imaging, and/or information for designating the magnification and focus of the captured image.

Note that the imaging conditions such as the above-described frame rate, exposure value, magnification, and focus may be appropriately designated by the user, or automatically set by the control unit 11413 of the CCU 11201 based on the acquired image signal. In the latter case, so-called auto exposure (AE) function, auto focus (AF) function, and auto white balance (AWB) function are installed in the endoscope 11100.

The camera head control unit 11405 controls driving of the camera head 11102 based on the control signal from the CCU 11201 received via the communication unit 11404.

The communication unit 11411 includes a communication device for transmitting and receiving various pieces of information to and from the camera head 11102. The communication unit 11411 receives an image signal transmitted from the camera head 11102 via the transmission cable 11400.

Furthermore, the communication unit 11411 transmits a control signal for controlling driving of the camera head 11102 to the camera head 11102. The image signal and the control signal can be transmitted by electric communication, optical communication, or the like.

The image processing unit 11412 performs various pieces of image processing on the image signal, which is RAW data transmitted from the camera head 11102.

The control unit 11413 performs various pieces of control related to imaging of a surgical site or the like performed by the endoscope 11100 and display of a captured image obtained by imaging of the surgical site or the like. For example, the control unit 11413 generates a control signal for controlling driving of the camera head 11102.

Furthermore, the control unit 11413 causes the display device 11202 to display a captured image of a surgical site or the like based on the image signal on which the image processing unit 11412 has performed image processing. At this time, the control unit 11413 may recognize various objects in the captured image by using various image recognition technologies. For example, the control unit 11413 can recognize a surgical tool such as forceps, a specific living body part, bleeding, mist at the time of using the energy treatment tool 11112, and the like by detecting the shape, color, and the like of the edge of the object included in the captured image. When displaying the captured image on the display device 11202, the control unit 11413 may superimpose and display various pieces of surgery support information on the image of the surgical site by using the recognition result. Since the surgery support information is superimposed and displayed, and presented to the operator 11131, a burden on the operator 11131 can be reduced, and the operator 11131 can reliably advance the surgery.

The transmission cable 11400 that connects the camera head 11102 and the CCU 11201 is an electric signal cable that supports electric signal communication, an optical fiber that supports optical communication, or a composite cable thereof.

Although, here in the illustrated example, communication is performed by wire by using the transmission cable 11400, communication between the camera head 11102 and the CCU 11201 may be wirelessly performed.

One example of the endoscopic surgery system to which the technology according to the present disclosure can be applied has been described above. The technology according to the present disclosure can be applied to the endoscope 11100 and the imaging unit 11402 of the camera head 11102 among the above-described configurations. For example, the imaging device 1 in FIG. 1 can be applied to an imaging unit 10402. Applying the technology according to the present disclosure to the imaging unit 10402 allows an operator to appropriately perform surgery while observing a plurality of parts in a surgical site imaged at completely the same timing by imaging the surgical site from different directions with the plurality of imaging units 10402.

Note that, although the endoscopic surgery system has been described here in one example, the technology according to the present disclosure may be applied to, for example, a microscopic surgery system and the like.

[6. Effects]

The imaging device 1 includes the imaging unit 2, the data acquisition unit 3, the clock generation unit 4, and the control unit 5. The imaging unit 2 captures an image, and generates image data. The data acquisition unit 3 acquires clock data related to an operation clock shared with the other imaging devices 101 to 103. The clock generation unit 4 generates the operation clock based on the clock data acquired by the data acquisition unit 3. The control unit 5 controls the operation of the imaging unit 2 based on the operation clock generated by the clock generation unit 4. This allows the imaging device 1 to capture an image in cooperation with the other imaging devices 101 to 103.

The data acquisition unit 3 acquires clock data including the global clock GCK shared by the plurality of GPS satellites 100 from the GPS satellite 100. This allows the data acquisition unit 3 to acquire clock data related to a global clock GCK common in the world.

The clock generation unit 4 compensates the generated operation clock so that the generated operation clock synchronizes with an operation clock used by the other imaging devices 101 to 103. This allows the clock generation unit 4 to generate the same operation clock as the operation clock used by the other imaging devices 101 to 103.

The clock generation unit 4 compensates the operation clock based on the characteristics, operation voltage, and temperature of a circuit element. This allows the clock generation unit 4 to eliminate a phase shift between the operation clock of the imaging device 1 and the operation clock of the other imaging devices 101 to 103. The phase shift is caused by individual differences between circuit elements, operation speed changes due to fluctuations in operation voltage and temperature, and the like.

The data acquisition unit 3 acquires clock data including time data indicating an absolute time. The control unit 5 adds the time data to the image data generated by the imaging unit 2, and outputs the image data to the outside of the imaging device. This can assure that a plurality of simultaneously captured images has been captured at accurately the same time.

The imaging device 1 further includes the detection pixel 21 that detects flickering light emitted from the flicker light sources 111 and 112. The flicker light sources 111 and 112 flicker in accordance with the frequency of a commercial power source. The clock generation unit 4 generates the operation clock based on the flickering cycle of the flickering light detected by the detection pixel 21. This allows the imaging device 1 to capture an image in cooperation with the other imaging devices 101 to 103, which generate the operation clock from flickering light emitted from the flicker light sources 111 and 112.

The detection pixel 21 is provided in an imaging region where imaging pixels for capturing an image are arranged. This allows the imaging device 1 to inhibit an increase in cost since the detection pixel is not required to be separately provide for detecting the flickering light Fs.

The detection pixel 21 is provided outside an imaging region where imaging pixels for capturing an image are arranged. This allows the imaging device 1 to capture an image by using all the imaging pixels in the imaging region, so that the image can be captured with high quality.

When the data acquisition unit 3 does not acquire clock data, the clock generation unit 4 generates the operation clock based on the flickering cycle of flickering light. This allows the imaging device 1 to generate the same operation clock as that of the other imaging devices 101 to 103 that generate the operation clock from flickering light even when clock data cannot be acquired from the GPS satellite 100.

The clock generation unit 4 compensates the operation clock based on the current position of the imaging device 1. This allows the clock generation unit 4 to generate an operation clock synchronized with the frequency of the commercial power source CPS even when noise is superimposed on the commercial power source CPS.

Note that the effects set forth in the specification are merely examples and not limitations. Other effects may be exhibited.

Note that the present technology may also have the configurations as follows.

(1)
An imaging device including:
an imaging unit that captures an image and generates image data;
a data acquisition unit that acquires clock data related to an operation clock shared with another imaging device;
a clock generation unit that generates the operation clock based on the clock data acquired by the data acquisition unit; and
a control unit that controls operation of the imaging unit based on the operation clock generated by the clock generation unit.

(2)
The imaging device according to (1),
in which the data acquisition unit acquires the clock data including a global clock shared by a plurality of global positioning system (GPS) satellites from a GPS satellite.

(3)
The imaging device according to (1) or (2),
in which the clock generation unit compensates the generated operation clock so that the operation clock synchronizes with an operation clock used by the other imaging device.

(4)
The imaging device according to any one of (1) to (3),
in which the clock generation unit compensates the operation clock based on characteristics, operation voltage, and temperature of a circuit element.

(5)
The imaging device according to any one of (1) to (4),
in which the data acquisition unit acquires the clock data including time data indicating an absolute time, and
the control unit adds the time data to the image data generated by the imaging unit, and outputs the image data to an outside of the imaging device.

(6)
The imaging device according to (1), further including
a detection pixel that detects flickering light emitted from a flicker light source that flickers in accordance with a frequency of a commercial power source,
in which the clock generation unit generates the operation clock based on a flickering cycle of the flickering light detected by the detection pixel.

(7)
The imaging device according to (6),
in which the detection pixel is provided in an imaging region where an imaging pixel for capturing the image is arranged.

(8)
The imaging device according to (6),
in which the detection pixel is provided outside an imaging region where an imaging pixel for capturing the image is arranged.

(9)
The imaging device according to any one of (6) to (8),
in which, when the data acquisition unit does not acquire the clock data, the clock generation unit generates the operation clock based on the flickering cycle of the flickering light.

(10)
The imaging device according to any one of (6) to (9),
in which the clock generation unit compensates the operation clock based on a current position of the imaging device.

(11)
An imaging method including
an imaging device causing:
an imaging unit to capture an image and generate image data;
a data acquisition unit to acquire clock data related to an operation clock shared with another imaging device;
a clock generation unit to generate the operation clock based on the clock data acquired by the data acquisition unit; and a control unit to control operation of the imaging unit based on the operation clock generated by the clock generation unit.

REFERENCE SIGNS LIST

1 IMAGING DEVICE
2 IMAGING UNIT
3 DATA ACQUISITION UNIT
4 CLOCK GENERATION UNIT
5 CONTROL UNIT
6 I/F
100 GPS SATELLITE
101 to 103 OTHER IMAGING DEVICES
PS POWER COMPANY
CP INFORMATION PROVIDING COMPANY

The invention claimed is:

1. A first imaging device, comprising:
an imaging unit configured to capture an image and generate image data of the captured image, wherein the imaging unit includes a light receiving region;
a plurality of antennas around the light receiving region of the imaging unit, wherein an arrangement of the plurality of antennas around the light receiving region prevents radio waves transmitted from a plurality of global positioning system (GPS) satellites from being blocked;
a data acquisition unit configured to acquire clock data from a GPS satellite of the plurality of GPS satellites, wherein
the clock data is acquired via the plurality of antennas, and
the clock data includes a global clock shared by the plurality of GPS satellites;
a clock generation unit configured to generate a first operation clock based on the clock data acquired by the data acquisition unit; and
a control unit configured to control operation of the imaging unit based on the first operation clock generated by the clock generation unit.

2. The first imaging device according to claim 1, wherein
the clock generation unit is further configured to compensate the first operation clock to synchronize the first operation clock with a second operation clock, and
the second operation clock is used by a second imaging device that captures the image simultaneously with the first imaging device.

3. The first imaging device according to claim 1, wherein the clock generation unit is further configured to compensate the first operation clock based on at least one of characteristics of a circuit element of the first imaging device, an operation voltage, or a temperature of the first imaging device.

4. The first imaging device according to claim 1, wherein the data acquisition unit is further configured to acquire the clock data that includes time data indicating an absolute time, and
the control unit is further configured to:
add the time data to the image data generated by the imaging unit; and
output the image data to an outside of the first imaging device.

5. The first imaging device according to claim 1, further comprising a detection pixel configured to detect flickering light emitted from a flicker light source, wherein
the flicker light source flickers based on a frequency of a commercial power source, and
the clock generation unit is further configured to generate the first operation clock based on a flickering cycle of the flickering light detected by the detection pixel.

6. The first imaging device according to claim 5, wherein the imaging unit further includes an imaging region, and
the imaging region includes:
an imaging pixel configured to capture the image; and
the detection pixel.

7. The first imaging device according to claim 5, wherein the imaging unit further includes an imaging region,
the detection pixel is outside of the imaging region, and
the imaging region includes an imaging pixel configured to capture the image.

8. The first imaging device according to claim 5, wherein, in a case where the data acquisition unit does not acquire the clock data, the clock generation unit is further configured to generate the first operation clock based on the flickering cycle of the flickering light.

9. The first imaging device according to claim 5, wherein the clock generation unit is further configured to compensate the first operation clock based on a current position of the first imaging device.

10. An imaging method, comprising:
in an imaging device:
capturing, by an imaging unit of the imaging device, an image, wherein the imaging unit includes a light receiving region;
generating, by the imaging unit, image data of the captured image;
acquiring, by a data acquisition unit of the imaging device, clock data from a global positioning system (GPS) satellite of a plurality of GPS satellites, wherein
the clock data is acquired via a plurality of antennas,
the plurality of antennas are around the light receiving region of the imaging unit,
an arrangement of the plurality of antennas around the light receiving region prevents radio waves transmitted from the plurality of GPS satellites from being blocked, and
the clock data includes a global clock shared by the plurality of GPS satellites;
generating, by a clock generation unit of the imaging device, an operation clock based on the clock data acquired by the data acquisition unit; and
controlling, by a control unit of the imaging device, operation of the imaging unit based on the operation clock generated by the clock generation unit.

* * * * *